US008686670B2

(12) United States Patent  (10) Patent No.: US 8,686,670 B2
Verheyen et al.  (45) Date of Patent: Apr. 1, 2014

(54) METHOD AND APPARATUS FOR CALIBRATING AND TESTING BRAKE HOLDING TORQUE

(75) Inventors: Kurtis L. Verheyen, Shorewood, WI (US); Aaron Kureck, Oconomowoc, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 265 days.

(21) Appl. No.: 13/331,862

(22) Filed: Dec. 20, 2011

(65) Prior Publication Data
US 2013/0154522 A1  Jun. 20, 2013

(51) Int. Cl.
*H02K 7/10* (2006.01)
(52) U.S. Cl.
USPC .......... 318/372; 318/370; 318/757; 318/432; 318/45; 318/99; 340/500; 340/635; 340/648; 340/665; 340/666; 73/121; 73/490
(58) Field of Classification Search
USPC .......... 318/372, 370, 101, 88, 45, 99, 757, 318/432, 59, 60; 340/500, 635, 648, 665, 340/666; 73/121, 490
See application file for complete search history.

(56) References Cited

U.S. PATENT DOCUMENTS

| | | | | |
|---|---|---|---|---|
| 5,077,508 | A * | 12/1991 | Wycoff et al. | 318/436 |
| 5,210,473 | A * | 5/1993 | Backstrand | 318/99 |
| 5,343,134 | A * | 8/1994 | Wendt et al. | 318/757 |
| 5,548,198 | A * | 8/1996 | Backstrand | 318/799 |
| 6,463,812 | B2 * | 10/2002 | Dubois | 73/862.393 |
| 6,651,494 | B1 * | 11/2003 | Herterich et al. | 73/130 |
| 6,711,946 | B2 | 3/2004 | Hofmann | |
| 6,966,544 | B2 * | 11/2005 | McCormick et al. | 254/342 |
| 7,148,652 | B2 | 12/2006 | Ghanemi et al. | |
| 2009/0198406 | A1 | 8/2009 | Brown et al. | |
| 2009/0293601 | A1 | 12/2009 | Huard et al. | |
| 2010/0058850 | A1 | 3/2010 | Ortmaier et al. | |
| 2010/0154527 | A1 | 6/2010 | Illan | |

* cited by examiner

*Primary Examiner* — Rita Leykin
(74) *Attorney, Agent, or Firm* — Boyle Frederickson, S.C.

(57) ABSTRACT

A system and method for determining the holding torque of a brake in a material handling system is disclosed. The material handling system may include a bridge, a trolley, and a hoist, each driven along a different axis by a motor. A brake is operatively coupled to the motor to prevent unwanted motion of the motor. A motor controller is coupled to each motor which controls operation of the motor and its corresponding brake. The motor controller generates a torque command to the motor while keeping the brake set. The initial torque command is less than the holding torque of the brake. The torque command is incremented until motion is detected on the motor. The torque value when motion is detected is stored in the motor controller and displayed to an operator.

20 Claims, 4 Drawing Sheets

METHOD AND APPARATUS FOR CALIBRATING AND TESTING BRAKE HOLDING TORQUE

BACKGROUND OF THE INVENTION

The subject matter disclosed herein relates to determining the holding torque of a brake. More specifically, the subject matter disclosed herein relates to a method and apparatus for calibrating and testing the holding torque of a brake used in a material handling system.

Material handling systems are widely used, to lift heavy loads, weighing up to hundreds of tons. A typical material handling system includes at least one motor used to raise and lower the load and at least one additional motor to position the material handling system over the load to be moved. Common applications include manufacturing facilities, in which large components may be positioned for assembly and/or the final assembly may be moved for shipping. In the shipping industry, containers are loaded and unloaded between storage facilities, trucks, trains, and ships. Such material handling systems typically include a hook block, connected by a cable to a drum, which is, in turn, connected directly or indirectly through a gearbox, to the motor. The hook may be directly connected to a lifting point on the object or indirectly connected to the object via another lifting apparatus such as chains, slings, or custom structures. The motor then rotates in one direction to raise the load and in the other direction to lower the load.

During operation, a material handling system typically moves a load from a first location to a second location. The typical process for moving a load includes the following steps: positioning the material handling system over the load, lowering the hook to the load, securing the hook to the load, raising the hook and the load, moving the material handling system to the desired location, lowering the hook and the load, disconnecting the hook from the load, and raising the hook. During each step in the process, one or more axes of the material handling system may be involved. However, each axis is not involved in every step. Thus, to conserve energy and reduce wear on the motors a brake is typically set to prevent motion on an axis not actively being employed to move the load. In addition, the brake is typically rated to, apply a holding torque at some percentage greater than the rated torque of the motor. The extra holding torque is provided to ensure that the brake can hold the load or restrict undesired motion of the motor.

As is known to those skilled in the art, certain applications may require verification of the holding torque produced by the brake. For example, material handling systems used to move hazardous and/or very expensive loads may require such verification. Similarly, material handling systems used in applications where failure of a brake may result in danger to a human operator or another worker may also require such verification. Further, such verification must be performed not only upon commissioning of the system but on a periodic basis to verify continued safe operation of the brake. Thus, the holding torque must be determined in the field while installed on the material handling system and not just in the factory.

Existing methods for determining the holding torque of a brake have not been realized without certain drawbacks. For example, manual verification of the brake may be performed by attaching a torque wrench to a rotating member of the drive shaft. The torque wrench may be configured to supply the holding torque for the brake and a suitable force applied to the drive shaft via the torque wrench. However, this method of testing is limited in the amount of force a person may apply to the wrench or may alternately require a second mechanical device to apply the force to the wrench. Further, partial disassembly of the drive system may be required to manually perform the verification.

Alternately, a processor configured to coordinate operation of the brake and motor may generate a command to the motor to produce torque equal to the holding torque of the brake while leaving the brake set. However, this results in a pass/fail test of the holding torque of the brake and does not provide an indication of the actual holding torque provided by the brake. Thus, in the event the brake does not hold, an operator does not know how much adjustment of the brake is required.

Thus, it is desirable to provide a system configured to automatically determine the holding torque of the brake in a material handling system and provide an indication of the holding torque to an operator to facilitate calibration of the brake.

BRIEF DESCRIPTION OF THE INVENTION

The subject matter disclosed herein describes a system and method for determining the holding torque of a brake in a material handling system. The material handling system may include a bridge, a trolley, and a hoist, each driven along a different axis by a motor. A brake is operatively coupled to the motor to prevent unwanted motion of the motor. A motor controller is coupled to each motor which controls operation of the motor and its corresponding brake. The motor controller generates a torque command to the motor while keeping the brake set. The initial torque command is less than the holding torque of the brake. The torque command is incremented until motion is detected on the motor. The torque value when motion is detected is stored in the motor controller and displayed to an operator.

According to one embodiment of the invention, a method of testing the holding torque of a brake in a material handling system includes the steps of setting the brake to operatively engage a shaft rotated by an electric motor and determining an initial value for a torque reference to be supplied to the electric motor. A motor controller configured to control rotation of the electric motor is enabled, and a current is supplied to the electric motor from the motor controller corresponding to the torque reference. A feedback signal is monitored with the motor controller to detect rotation of the shaft. If rotation of the shaft is not detected, the value of the torque reference is increased and the steps of supplying the current to the electric motor and monitoring the feedback signal are repeated, but if rotation of the shaft is detected, a value of torque at which rotation was detected is stored and the test is completed.

According to another aspect of the invention, an amplitude of the current supplied to the electric motor during the test is monitored and converted to a magnitude of torque being generated by the motor. The magnitude of the torque is displayed to an operator. An amplitude of the current supplied to the electric motor with the motor controller is monitored and, if no rotation of the shaft is detected and if the amplitude of the current is greater than or equal to a predetermined threshold, the current is removed from the motor and the test stops.

According to still another aspect of the invention, the value of torque at which rotation was detected is compared to a rated holding torque for the brake. If the torque at which rotation was detected is less than the rated holding torque, either a visual or an audible alert is generated for an operator, the brake may be adjusted to increase the holding torque, and the test repeated. If the torque at which rotation was detected is equal to or greater than the rated holding torque, the test is complete.

According to yet another aspect of the invention, at least one fault condition detected by the motor controller is disabled at the start of the test and re-enabled upon completion of the test.

According to another embodiment of the invention, a method for determining a level of holding torque for a brake operatively coupled to a motor in a material handling system is disclosed, wherein rotation of the motor is controlled by a motor controller. The method includes the steps of setting the brake to apply a holding torque to prevent rotation of the motor and supplying a current from the motor controller to the motor to generate a torque counter to the holding torque of the brake. The torque generated by an initial amplitude of current is less than the holding torque of the brake. The method includes the additional steps of increasing the current supplied from the motor controller to the motor and monitoring a feedback signal from the motor. The feedback signal provides an indication of rotation of the motor, and upon detection of rotation of the motor, a value corresponding to the torque generated by the motor is stored.

According to other aspects of the invention, supplying current to the motor includes generating either a speed reference, or a torque reference to the motor. The stored value corresponding to the torque generated by the motor is a measured current, a torque reference, or a derived torque value. The stored value corresponding to the torque generated by the motor may be displayed, and this displayed value compared to the holding torque of the brake. The holding torque of the brake may be adjusted responsive to the displayed value and each of the steps may be repeated until the torque generated by the motor is greater than or equal to the rated holding torque of the brake.

According to another embodiment of the invention, an apparatus for determining a level of holding torque for a brake operatively coupled to a drive train of an axis in a material handling system includes a frame, which includes at least one member movable along an axis. A motor is operatively connected to one of the moveable members to drive the movable member, and a drive train is operatively coupled between the motor and the member to move the member along the axis. A brake is, operatively coupled to either the motor or the drive train to prevent movement of the member along the axis, and a position feedback device is operatively coupled to the motor to generate a signal corresponding to rotation of the motor. A motor controller is operatively coupled to the motor to control rotation of the motor. The motor controller includes an input receiving power from a power source, an output providing a controlled voltage and current to the motor, a memory device storing a series of processor executable instructions, and a processor in communication with the memory device. The processor is configured to execute, the instructions to provide an initial current to the motor generating, a torque having a magnitude less than a rated holding torque of the brake, incrementally increase the level of the current supplied to the motor, monitor the signal from the position feedback device to detect rotation of the motor, and store a value corresponding to the torque supplied to the motor if rotation of the motor is detected.

According to other aspects of the invention, the value stored is a function of at least one of a current reference, a current feedback, and an estimated current value, and the motor controller may include an operator interface configured to display the stored value of the torque. The drive train may include an output shaft extending from the motor, a sheave configured to wind and unwind a cable around an outer periphery of the sheave, and a gearbox coupled between the output shaft of the motor and the sheave. The movable member may be the cable wrapped around the sheave and the axis of motion is in a generally vertical plane. The motor may include an output shaft operatively coupled to the drive train and the brake may include a drum mounted on the output shaft and at least one shoe selectively engaging the drum to prevent rotation of the motor. The processor in the motor controller may be further configured to initially disable at least a portion of a plurality of fault conditions prior to providing the initial current to the motor and to enable the fault conditions upon detection of rotation of the motor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
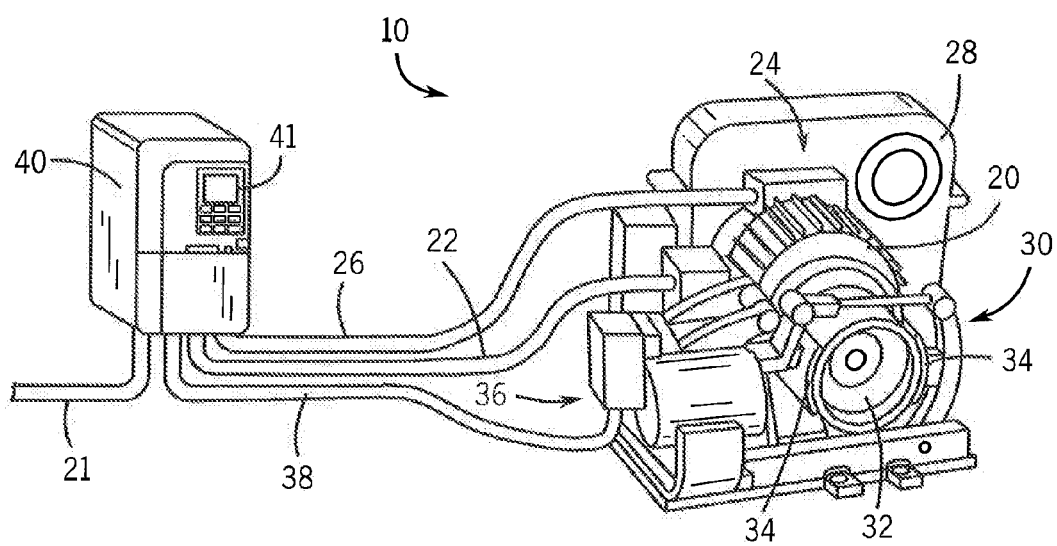
FIG. 1 is a schematic representation of an exemplary embodiment incorporating the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 3:
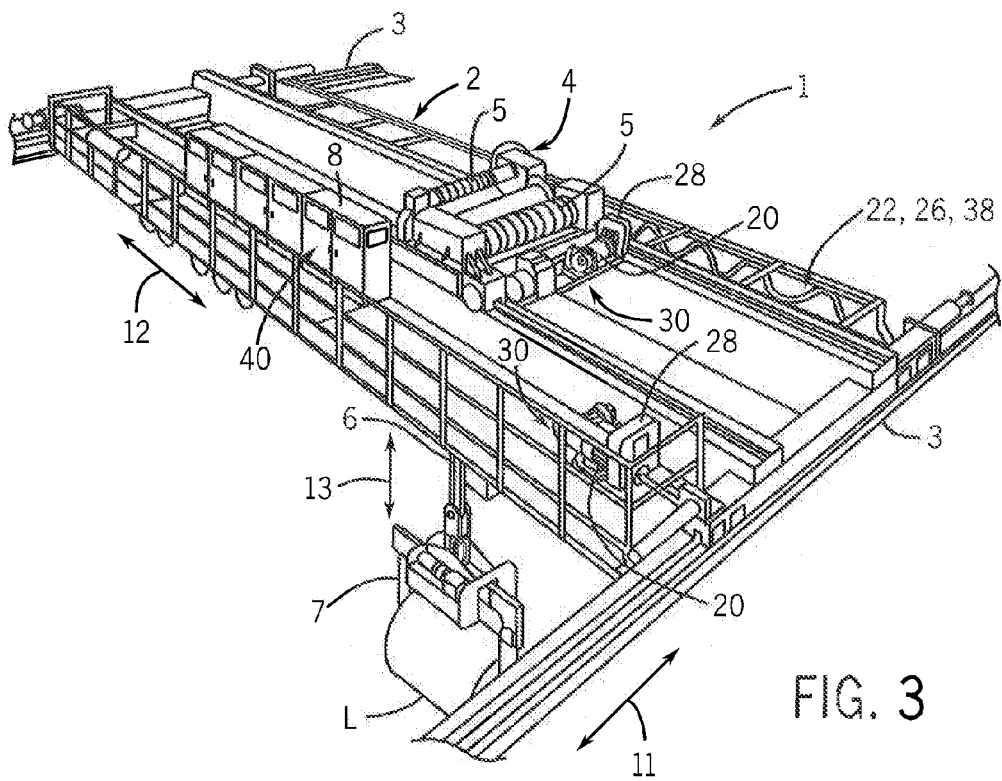
FIG. 3 is an exemplary environment incorporating the exemplary embodiment of FIG. 1.

Turning initially to FIG. 3, an exemplary embodiment of a material handling system 1 incorporating the present invention is illustrated. It is contemplated that the material handling system 1 may have numerous configurations according to the application requirements. According to one embodiment, the material handling system 1 may include a bridge 2 configured to move in a first axis of motion 11 along a pair of rails 3 located at either end of the bridge 2. A trolley 4 may be mounted on the bridge 2 to move in a second axis, of motion 12, generally perpendicular to the first axis of motion 11, along the length of the bridge 2. One or more sheaves 5, also referred to as drums, may be mounted to the trolley 4, around which a cable 6 is wound. The sheave 5 may be rotated in either direction to wind or unwind the cable 6 around the sheave 5. The cable 6 is operatively connected to a hook block or any other lifting fixture 7 such that the hook block may be connected to a load, L, and move in a third axis of motion 13, generally perpendicular to each of the first and the second axes of motions, 11 and 12. One or more control cabinets 8 housing, for example, the motor controller 40 are mounted on the bridge 2.

Referring next to FIG. 1, an exemplary portion of the drive system 10 for one axis of motion in the material handling system 1 is illustrated. The exemplary portion of the drive system 10 includes a motor 20 controlled by a motor controller 40, also referred to herein as a motor drive or an inverter. The motor controller 40 delivers a regulated voltage and/or current to the motor 20 via a set of electrical conductors 22. The magnitude and/or frequency of the voltage or current may be varied to control the speed at which the motor 20 rotates, the torque produced by the motor 20, or a combination thereof. A feedback device 24, such as an encoder or a resolver, is connected to the motor, typically by mounting the feedback device 24 to the output shaft at one end of the motor 20. The feedback device 24 provides to the motor controller 40, via electrical conductors 26, any suitable electrical signal, corresponding to rotation of the motor 20, as would be known in the art. A gearbox 28 may be connected to the output shaft of the motor 20 for rotating any suitable drive member at a desired speed according to the requirements of the axis of motion to which the gearbox 28 is connected. Optionally, the motor 20 may be configured to directly rotate the drive member.

A braking unit 30 is supplied to prevent undesired rotation of the motor 20. As illustrated in FIG. 1, one embodiment of the braking unit 30 includes a brake wheel 32 mounted to a shaft extending from the motor 20. Brake shoes 34 engage opposite sides of the brake wheel 32. A brake controller 36 selectively engages and disengages the brake shoes 34 to the brake wheel 32. The brake controller 36 may be, but is not limited to, an electric or a hydraulic controller receiving a command signal from the motor controller 40 via an electrical conductor 38. Optionally, the braking unit 30 may include, for example, a disc attached to the motor and employee brake pads to engage the disc. It is contemplated that numerous other configurations of brakes may be employed without deviating from the scope of the present invention. According to still other embodiments, the braking unit 30 may be connected at any suitable location along the drive system 10 to prevent motion of the commanded axis according to application requirements.

The exemplary embodiment of a material handling system 1 is not intended to be limiting. The present invention may be incorporated into material handling systems utilizing other load handling members, including but not limited to overhead material handling systems incorporating a block and hook, a bucket, a clam-shell attachment, or a magnet. Similarly, the present invention may be incorporated into winch-type applications which may spool out and reel in a cable along a more horizontal plane, including but not limited to a winch, a dredge, an anchor, or other side-pull systems The following definitions will be used to describe exemplary material handling systems throughout this specification. As used herein, the terms "raise" and "lower" are intended to denote the operations of letting out or reeling in a cable 6 connectable to a load handling member 7 of a material handling system 1 and are not limited to moving a load, L, in a vertical plane. The load handling member 7 may be any suitable device for connecting to or grabbing a load, including, but not limited to, a hook block, a bucket, a clam-shell, a grapple, or a magnet. While an overhead crane may lift a load vertically, a winch may pull a load from the side. Further, an appropriately configured load handling member 7 may allow a load to spool out cable or be reeled in at any desired angle between a horizontal plane and a vertical plane.

The "cable," also known as a "rope," may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor controller 40. The motor controller 40 controls operation of the motor 20, rotating the motor 20 to cause the cable 6 to wind around or pay out from the sheave 5. A "run" may include multiple starts and stops of the motor 20 and, similarly it may require multiple "runs" to let the cable 6 reel fully out or wind completely around the sheave 5. Further, the cable 6 need not be fully let out or wound up before reversing direction of rotation of the motor 20. In addition, direction of rotation of the motor 20 may be reversed within a single run.

Figure 2:
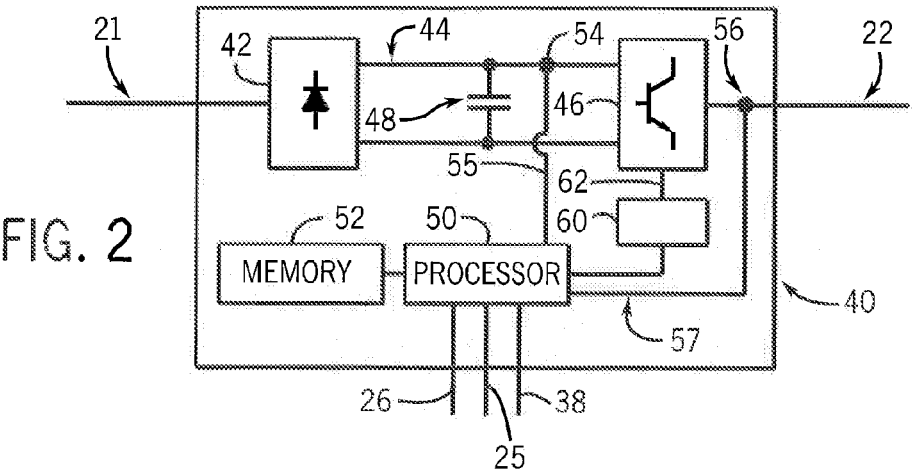
FIG. 2 is a block diagram of a motor controller for the exemplary embodiment of FIG. 1.

Referring next to FIG. 2, the motor controller 40 receives a command signal 25 from any suitable operator interface. The operator interface may be, but is not limited to, a keypad 41 mounted on the motor controller 40, a remote industrial joystick with a wired connection to the motor controller 40, or a radio receiver connected to the motor controller receiving a wireless signal from a corresponding radio transmitter. The motor controller 40 includes an input 21 configured to receive power, which may be a single or multiple phase alternating current (AC) or a direct current (DC) power source. The motor controller 40 converts the input power 21 to a desired power at an output 22 configured to connect to the motor 20. The output 22 may similarly be a single or multiple phase AC or a DC output, according to the application requirements. The motor 20 may include a position sensor 24 connected to the motor controller 40 via an electrical connection 26 to provide a position feedback signal corresponding to the angular position of the motor 20. A rectifier section 42 is electrically connected to the power input 21. The rectifier section 42 may be either passive, such as a diode bridge, or active, including controlled power electronic devices such as transistors. Preferably, the input power 21 is converted to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged, in serial, parallel, or a combination thereof according to the power ratings of the motor controller 40. An inverter section 46 converts the DC voltage on the DC bus 44 to the desired output power 22 for the motor 20 according to switching signals 62.

The motor controller 40 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single, or multiple electronic devices, including static memory, dynamic memory, or a combination thereof. The memory device 52 preferably stores operating parameters of the motor controller 40 and one or more programs, which include instructions executable on the processor 50. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor controller 40. The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

Figure 4:
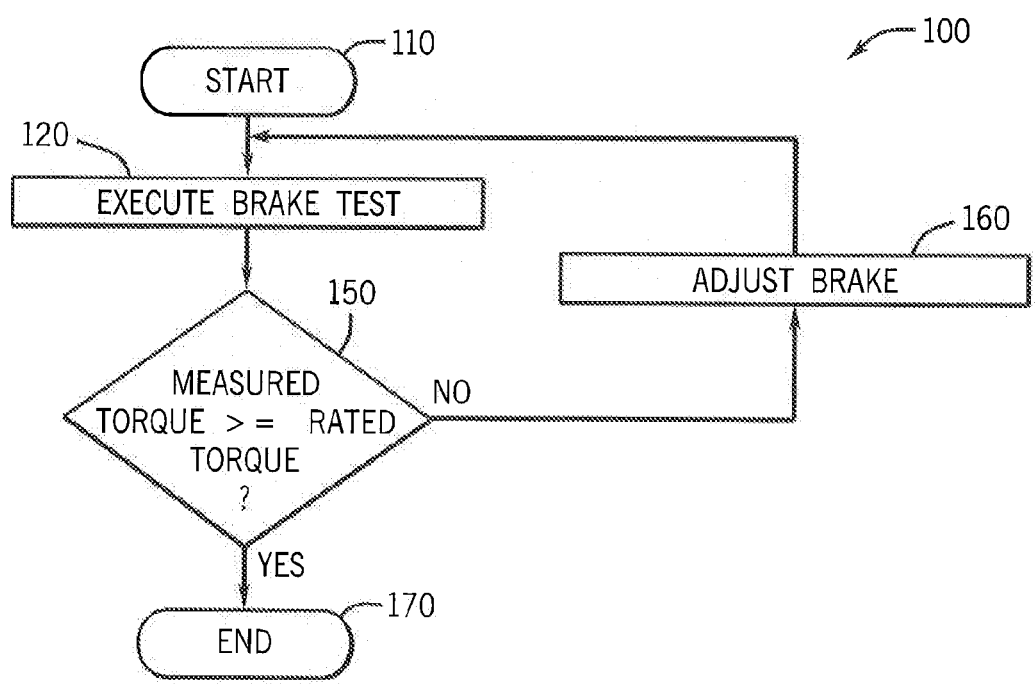
FIG. 4 is a flow diagram illustrating the steps for calibrating the holding torque of a brake.

In operation, the processor 50 receives a command signal 25 indicating a desired operation of the corresponding motor 20 in the material handling system 1 and provides a variable amplitude and frequency output voltage 22 to the motor responsive to the command signal 25. Referring next to FIG. 4, a graphical representation of a brake test sequence 100 according to one embodiment of the invention is illustrated. Preferably, a trained operator first places the material handling system 1 into an appropriate condition to execute a test of the holding torque of the braking unit 30. The operator provides the command signal 25 by initiating the test sequence 100, for example, at block 110 via a specific sequence of key presses on the keypad 41. Optionally, an external input, including, but not limited to, a toggle switch or push button may be used to receive the operator command. The processor 50 executes the brake test at block 120 and as described in more detail below. At steps 150 and 160, the operator first determines whether the measured holding torque is equal to or greater than the rated holding torque of the brake. If the measured holding torque is greater than rated holding torque no adjustment is necessary, but if the measured holding torque is less than the rated holding torque, the operator adjusts the brake to increase the holding torque applied by the brake. In addition, by having a visual display of the measured holding torque, the operator knows how much adjustment is required and may more quickly calibrate the brake to the proper holding torque.

Figure 5:
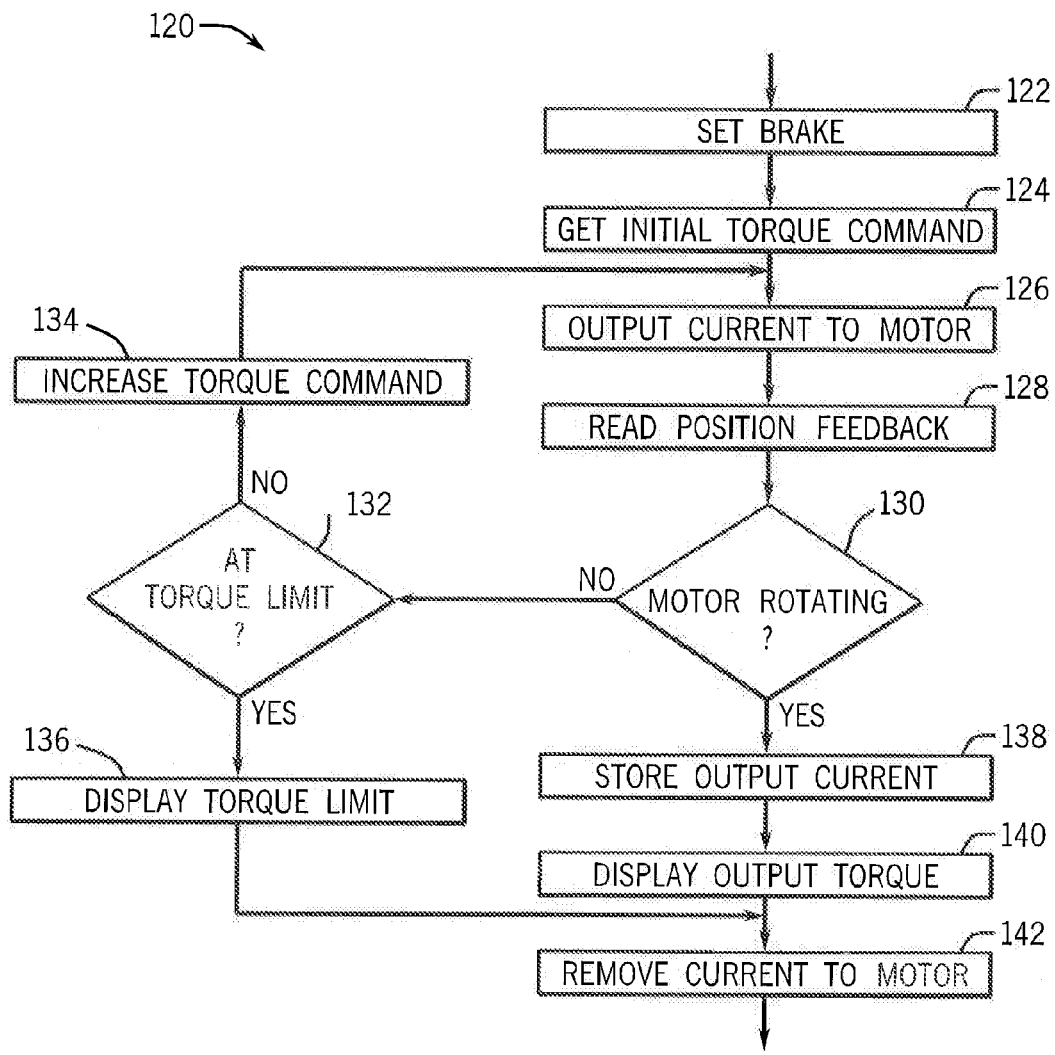
FIG. 5 is a flow diagram illustrating additional details of executing the brake test of FIG. 4.

Referring next to FIG. 5, the steps executed by the processor 50 during the brake test 120 are illustrated in more detail. The processor 50 sends a signal 38 to set the brake at step 122 and will keep the brake set throughout the duration of the brake test 120. An initial torque command is determined at step 124. The initial torque command may be stored in the memory 52, for example, as a parameter setting. Optionally, the torque command may be derived from a current command, stored in memory 52 as a magnitude or percentage of motor rated current. The processor 50 then executes a modulation routine to generate the switching signals 62 for the inverter section 46. The inverter section 46 converts the DC voltage on the DC bus 44 to an output voltage 22 such that the desired current, and corresponding torque, is generated by the motor 20. One or more current sensors 56 provide feedback signals 57 to the processor 50 such that it may regulate the current output to the motor 20.

A position feedback device 24, such as an encoder or resolver, provides a feedback signal 26 to the processor 50 corresponding to the angular position of the motor 20. The processor 50, at step 128, monitors the feedback signal 26 to detect a change in position of the motor 20, indicating that the motor 20 is rotating. At block 130 a determination is made if the motor 20 is rotating. If the motor 20 is stationary, the processor 50, at step 132, determines whether the present torque command is at the torque limit. The torque limit may correspond to a limit for the motor controller 40 and/or the motor 20. Optionally, the torque limit may be an upper limit configurable for the brake test which is less than the torque limit for either the motor controller 40 or the motor 20. If the motor controller 40 can produce additional torque and the motor 20 is rated to accept an increased torque command, the processor increases the torque command at step 134. The brake test 120 then repeats the steps of providing current to the motor 20 and monitoring the position feedback signal 26 at the new torque level. The brake test 120 will continue to increment the torque command and monitor the motor 20 for movement until it either detects the motor 20 rotating, step 130, or reaches the torque limit, step 132, for either the motor controller 40 or the motor 20.

Upon detecting rotation of the motor 20, step 130, the processor 50 will store in memory 52 the present value of the torque being generated by the motor 20. Because the magnitude of current output to the motor 20 is directly related to the magnitude of torque, the processor 50 may store any suitable value used to derive the magnitude of torque, including, but not limited to the measured current signal 57, a current command, or a torque command. At step 140, the stored value may be displayed directly or converted to a torque value and displayed for the operator. The keypad 41, for example, may include a display portion on which the value may be displayed. Optionally, the processor 50 may transmit the value through any suitable wired or wireless output to a remote display device. If the brake test 120 reaches the torque limit of the motor 20 or of the motor controller 40 before detecting rotation of the motor 20, the value of the torque limit may be stored in memory 52 for display. Optionally, the motor controller 42 may display a torque limit message rather than displaying a value of the torque. At step 142 and upon completion of the brake test 120, the processor 50 removes the current supplied to the motor 20.

During a normal run of the material handling system 1, the motor controller 40 receives a command signal 25 and coordinates operation of the brake 30 and the motor 20 to execute the desired command 25. Typically, certain sequences must be performed to both start and stop motion of the material handling system 1 where the sequence may be dependant on the axis, 11-13, being commanded to move. For example, the motor 20 may be commanded to run at zero speed prior to opening the brake 30 such that the motor controller 40 is capable of maintaining the current position upon opening the brake 30. Once the brake 30 is open, the motor 20 may then be commanded to operate at a commanded torque or speed. In order to ensure correct operation of these sequences, the motor controller 40 may include multiple checks to verify, for example, that the brake 30 opened prior to attempting to run. If the operating sequence for the axis is not performed correctly, the motor controller 40 may stop the run and post a warning or fault message. Because the brake test 120 executes by attempting to turn the motor 20 while the brake 30 is still set, certain of these fault conditions may be trigged while attempting to run the brake test 120. Consequently, the motor controller 40 may be configured to temporarily disable certain of the fault conditions that would otherwise be set during the brake test 120 and re-enable the fault conditions upon completion of the brake test 120.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of testing the holding torque of a brake in a material handling system, the method comprising the steps of:
    setting the brake to operatively engage a shaft rotated by an electric motor;
    determining an initial value for a torque reference to be supplied to the electric motor;
    enabling a motor controller configured to control rotation of the electric motor;
    supplying a current to the electric motor from the motor controller corresponding to the torque reference;
    monitoring a feedback signal with the motor controller to detect rotation of the shaft; and
    if rotation of the shaft is not detected, increasing the value of the torque reference and repeating the steps of supplying the current to the electric motor and monitoring the feedback signal, but
    if rotation of the shaft is detected, storing a value of torque at which rotation was detected and completing the test.

2. A method of testing the holding torque of a brake in a material handling system according to claim 1, further comprising the steps of:
    monitoring an amplitude of the current supplied to the electric motor during the test;
    converting the amplitude of the current to a magnitude of torque being generated by the motor; and
    displaying the magnitude of torque to an operator.

3. A method of testing the holding torque of a brake in a material handling system according to claim 1, wherein if rotation of the shaft is not detected, the method further comprises the steps of:
    monitoring an amplitude of the current supplied to the electric motor with the motor controller; and
    if the amplitude of the current is greater than or equal to a predetermined threshold, removing current from the motor and stopping the test.

4. A method of testing the holding torque of a brake in a material handling system according to claim 1, further comprising the steps of:
    comparing the value of torque at which rotation was detected to a rated holding torque for the brake; and
    if the torque at which rotation was detected is less than the rated holding torque, generate one of a visual or an audible alert to an operator, but
    if the torque at which rotation was detected is equal to or greater than the rated holding torque, complete the test.

5. The method of testing the holding torque of a brake in a material handling system according to claim 1, further comprising the steps of:
    adjusting the brake to increase the holding torque if the torque at which rotation was detected is less than the rated holding torque; and
    repeating the test.

6. The method of claim 1 wherein the feedback signal corresponds to the angular position of the motor.

7. The method of claim 1 further comprising the initial step of disabling at least one fault condition detected by the motor controller.

8. The method of claim 7 further comprising the step of enabling the at least one fault condition upon completion of the test.

9. A method for determining a level of holding torque for a brake operatively coupled to a motor in a material handling system, wherein rotation of the motor is controlled by a motor controller, the method comprising the steps of:
    setting the brake to apply a holding torque to prevent rotation of the motor;
    supplying a current from the motor controller to the motor to generate a torque counter to the holding torque of the brake, wherein the torque generated by an initial amplitude of current is less than the holding torque of the brake;
    increasing the current supplied from the motor controller to the motor;
    monitoring a feedback signal from the motor, the feedback signal providing an indication of rotation of the motor;
    upon detection of rotation of the motor, storing a value corresponding to the torque generated by the motor.

10. The method of claim 9 wherein supplying current to the motor includes generating one of a speed reference or a torque reference to the motor.

11. The method of claim 9 wherein the stored value corresponding to the torque generated by the motor is one of a measured current, a torque reference, and a derived torque value.

12. The method of claim 9 further comprising the step of displaying the value corresponding to the torque generated by the motor.

13. The method of claim 12 further comprising the steps of:
    comparing the displayed value to the holding torque of the brake; and
    adjusting the holding torque of the brake responsive to the displayed value.

14. The method of claim 13 wherein each of the steps are repeated until the torque generated by the motor is greater than or equal to the rated holding torque of the brake.

15. An apparatus for determining a level of holding torque for a brake operatively coupled to a drive train of an axis in a material handling system, the apparatus comprising:
    a frame including at least one member movable along an axis;
    a motor operatively connected to one of the moveable members to drive the movable member;
    a drive train operatively coupled between the motor and the member to move the member along the axis;
    a brake operatively coupled to one of the motor and the drive train to prevent movement of the member along the axis;
    a position feedback device operatively coupled to the motor to generate a signal corresponding to rotation of the motor; and
    a motor controller operatively coupled to the motor to control rotation of the motor, the motor controller including:
        an input receiving power from a power source;
        an output providing a controlled voltage and current to the motor;
        a memory device storing a series of processor executable instructions; and
        a processor in communication with the memory device, wherein the processor is configured to execute the instructions to:
            provide an initial current to the motor generating a torque having a magnitude less than a rated holding torque of the brake,
            incrementally increase the level of the current supplied to the motor, monitor the signal from the position feedback device to detect rotation of the motor, and store a value corresponding to the torque supplied to the motor if rotation of the motor is detected.

16. The apparatus of claim 15 wherein the value stored is a function of at least one of a current reference, a current feedback, and an estimated current value.

17. The apparatus of claim 15 wherein the motor controller also includes an operator interface configured to display the stored value of the torque.

18. The apparatus of claim 15 wherein the drive train further comprises:

an output shaft extending from the motor;

a sheave configured to wind and unwind a cable around an outer periphery of the sheave; and a gearbox coupled between the output shaft of the motor and the sheave, wherein the movable member is the cable wrapped around the sheave and the axis of motion is in a generally vertical plane.

19. The apparatus of claim 15 wherein the motor includes an output shaft operatively coupled to the drive train and the brake includes a drum or a disc mounted on the output shaft and at least one shoe or pad selectively engaging the drum or disc to prevent rotation of the motor.

20. The apparatus of claim 15 wherein the processor in the motor controller is further configured to initially disable at least a portion of a plurality of fault conditions prior to providing the initial current to the motor and enabling the fault conditions upon detection of rotation of the motor.

* * * * *